(12) United States Patent
Ito et al.

(10) Patent No.: US 7,907,194 B2
(45) Date of Patent: Mar. 15, 2011

(54) IMAGING APPARATUS AND GAIN ADJUSTING METHOD FOR THE SAME

(75) Inventors: Katsuhide Ito, Shizuoka (JP); Takayuki Kawashima, Shizuoka (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 509 days.

(21) Appl. No.: 11/968,238

(22) Filed: Jan. 2, 2008

(65) Prior Publication Data
US 2008/0259197 A1    Oct. 23, 2008

(30) Foreign Application Priority Data

Apr. 18, 2007 (JP) ................. P2007-109743

(51) Int. Cl.
- *H04N 9/64* (2006.01)
- *H04N 3/14* (2006.01)
- *H04N 5/335* (2006.01)

(52) U.S. Cl. ................. 348/250; 348/311
(58) Field of Classification Search .......... 348/241, 348/250, 255, 300, 301
See application file for complete search history.

(56) References Cited

U.S. PATENT DOCUMENTS

| | | | |
|---|---|---|---|
| 3,898,452 A | 8/1975 | Hertel | |
| 5,337,340 A | 8/1994 | Hynecek | |
| 6,444,968 B1 | 9/2002 | Burt et al. | |
| 6,574,365 B1 * | 6/2003 | Weldy | 382/167 |
| 7,609,311 B2 * | 10/2009 | Denvir | 348/311 |
| 7,807,952 B2 * | 10/2010 | Hazelwood | 250/208.1 |
| 2005/0180602 A1 * | 8/2005 | Yang et al. | 382/103 |
| 2006/0163474 A1 | 7/2006 | Denvir | |
| 2007/0153103 A1 * | 7/2007 | Shibasaki | 348/241 |
| 2007/0228255 A1 * | 10/2007 | Akiyama | 250/207 |

FOREIGN PATENT DOCUMENTS

| | | |
|---|---|---|
| EP | 1 688 960 | 8/2006 |
| JP | 2003-009000 | 1/2003 |
| JP | 3483261 | 10/2003 |
| JP | 2006-203222 | 8/2006 |
| JP | 3862850 | 10/2006 |

OTHER PUBLICATIONS

M. S. Robbins et al., "The Noise Performance of Electron Multiplying Charge-Coupled Devices," IEEE Transactions on Electron Devices, IEEE Service Center, Piscataway, NJ, vol. 50, No. 5, May 1, 2003, pp. 1227-1232, XP011072658.

* cited by examiner

*Primary Examiner* — Sinh Tran
*Assistant Examiner* — Albert H Cutler
(74) *Attorney, Agent, or Firm* — Drinker Biddle & Reath LLP

(57) ABSTRACT

An imaging apparatus 1A includes an electron multiplying solid-state image pickup device which has an electron multiplier section for multiplying charge signals generated in respective pixels; a multiplication gain setting part 41 for setting a multiplication gain in the electron multiplier section; a standard deviation calculator 34 for calculating a noise standard deviation of a noise image acquired under a predetermined condition by the image pickup device; a reference standard deviation storage 35 storing a reference standard deviation, and a standard deviation comparator 36 for comparing the noise standard deviation and the reference standard deviation and outputting an obtained comparison result. At the time of gain adjustment, the multiplication gain setting part 41 adjusts the multiplication gain based on the comparison result by the standard deviation comparator 36. Thereby, an imaging apparatus which enables the user's side to easily and accurately re-adjust the multiplication gain of charge signals in the electron multiplying solid-state image pickup device, and a gain adjusting method for the same are realized.

5 Claims, 9 Drawing Sheets

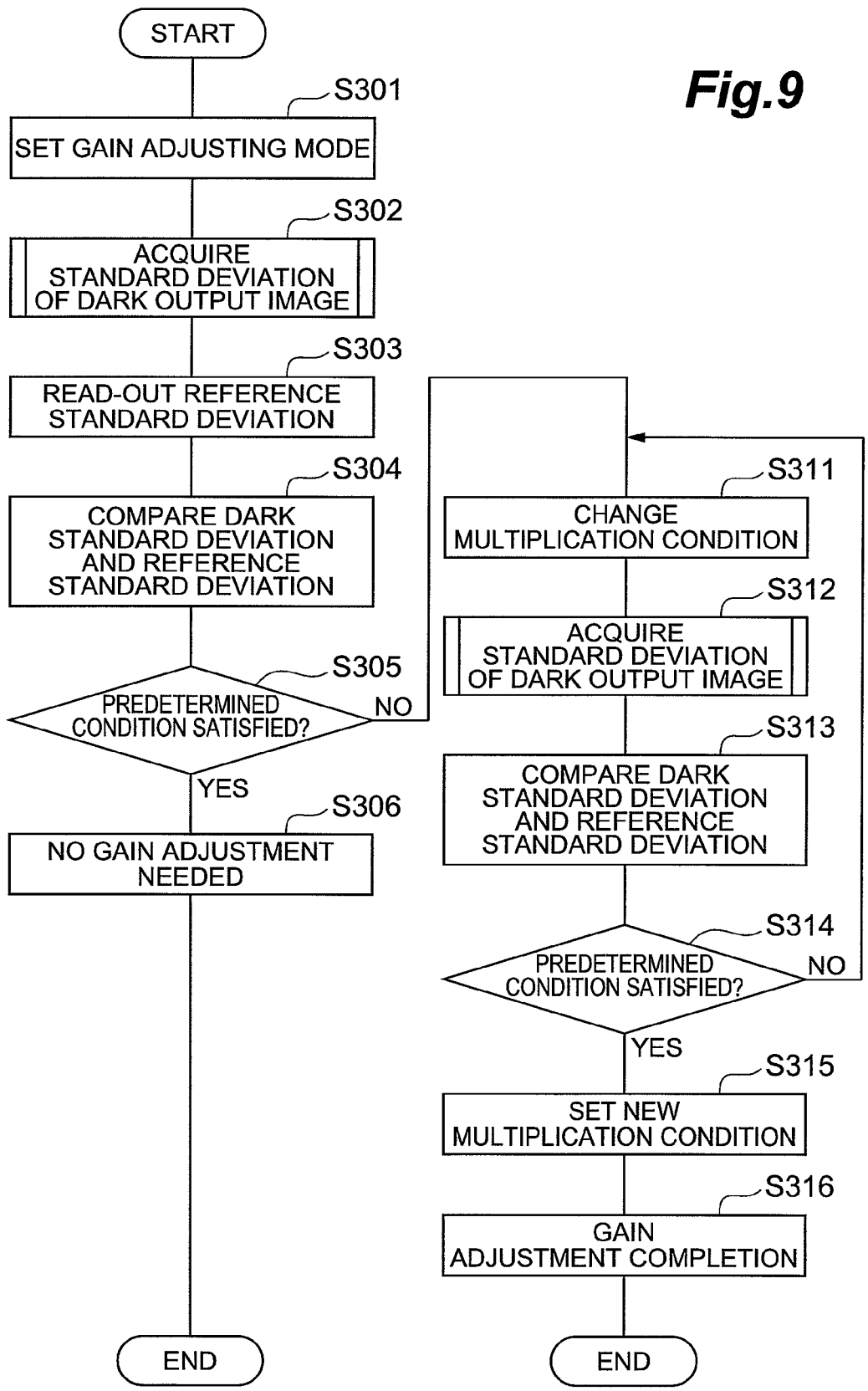

IMAGING APPARATUS AND GAIN ADJUSTING METHOD FOR THE SAME

BACKGROUND OF THE INVENTION

1. Field of the Invention

The present invention relates to an imaging apparatus using an electron multiplying solid-state image pickup device and a gain adjusting method for the same.

2. Related Background Art

Recently, an electron multiplying CCD (EM-CCD) has been developed and used as a solid-state image pickup device having an electron multiplying function. In the EM-CCD, a multiplier register is provided for a horizontal shift register which outputs charge signals from respective pixels of an imaging section, and in this multiplier register, by transferring charges by a voltage higher than normal, the charge signals are multiplied (for example, refer to Patent document 1: Japanese Patent Application Laid-Open No. 2006-203222, Patent document 2: Japanese Patent Publication No. 3483261, and Patent document 3: Japanese Patent Publication No. 3862850).

Herein, at the time of fluorescent observation of a sample such as a cell with a fluorescence microscope, fluorescence from the sample may be weak, so that it may be difficult to acquire an image at a sufficient sensitivity by using a normal image pickup device. On the other hand, the EM-CCD camera using the above-described electron multiplying CCD is useful for acquiring an image including such weak light at a high sensitivity as well as an ICCD camera and an EB-CCD camera, etc., which also have the electron multiplying function. The EM-CCD camera can be preferably used in various fields that require image acquisition at a high sensitivity as well as measurement of weak light in the above-described fluorescence observation.

SUMMARY OF THE INVENTION

In the above-described electron multiplying CCD, changes with time in multiplication gain of charge signals in the multiplier register may come into question. For example, in an EM-CCD camera as a product, normally, a multiplication condition such as a voltage applying condition to the multiplier register, for determining a multiplication gain of charge signals, are set under a predetermined condition by using a stable light source or the like before shipping the camera.

On the other hand, after shipping the EM-CCD camera, when the gain gradually deteriorates corresponding to use of the camera, it is difficult for the user's side to re-adjust the gain that must be re-adjusted under a predetermined condition as described above, and if such re-adjustment is performed, it is impossible to set the multiplication gain of the charge signals in the EM-CCD with a satisfactory accuracy. In addition, when the gain is re-adjusted by returning the camera to the shipping source, temporary use stoppage of the camera and operation for returning it are required.

The present invention was made to solve the above-described problems, and an object thereof is to provide an imaging apparatus which enables the user's side to easily and accurately re-adjust multiplication gain of charge signals in an electron multiplying solid-state image pickup device, and a gain adjusting method for the same.

In order to achieve this object, an imaging apparatus of the present invention includes: (1) an electron multiplying solid-state image pickup device which has a plurality of arrayed pixels, outputs charge signals generated in the respective pixels, and has an electron multiplier section which multiplies the charge signals; (2) multiplication gain setting means for setting a multiplication gain for the charge signals by setting a multiplication condition for the electron multiplier section of the solid-state image pickup device; (3) standard deviation calculating means for calculating a standard deviation of a noise image acquired under a predetermined imaging condition by the solid-state image pickup device as a noise standard deviation for gain adjustment; (4) reference standard deviation storing means for storing a reference standard deviation acquired in advance as a noise standard deviation that becomes a reference for gain adjustment; and (5) standard deviation comparing means for comparing the noise standard deviation calculated by the standard deviation calculating means at the time of gain adjustment and the reference standard deviation stored in the reference standard deviation storing means and outputting an obtained comparison result, wherein (6) at the time of gain adjustment, the multiplication gain setting means adjusts the multiplication gain based on the comparison result by the standard deviation comparing means.

Further, a gain adjusting method of the present invention of an imaging apparatus that includes (a) an electron multiplying solid-state image pickup device which has a plurality of arrayed pixels, outputs charge signals generated in the respective pixels, and has an electron multiplier section which multiplies the charge signals, (b) multiplication gain setting means for setting a multiplication gain for the charge signals by setting a multiplication condition for the electron multiplier section of the solid-state image pickup device; the method includes: (c) a standard deviation calculation step of calculating a standard deviation of a noise image acquired under a predetermined imaging condition by the solid-state image pickup device as a noise standard deviation for gain adjustment, (d) a reference standard deviation reading-out step of reading-out a reference standard deviation acquired in advance as a noise standard deviation that becomes a reference for gain adjustment from storing means, (e) a standard deviation comparison step of comparing the noise standard deviation calculated in the standard deviation calculation step at the time of gain adjustment and the reference standard deviation readout in the reference standard deviation reading-out step and outputting an obtained comparison result; and (f) a multiplication gain adjustment step of adjusting the multiplication gain based on the comparison result in the standard deviation comparison step at the time of gain adjustment by the multiplication gain setting means.

In the above-described imaging apparatus and gain adjusting method for the same, concerning a multiplication gain of charge signals in the imaging apparatus including an electron multiplying solid-state image pickup device, a standard deviation in an image of intensity data in a noise image acquired under a predetermined condition is set as an index of gain adjustment. A reference standard deviation prepared in advance in the storing means and the noise standard deviation acquired at the time of gain adjustment are compared to each other, and based on a result of this comparison, a multiplication condition such as a voltage applying condition to the electron multiplier section of the solid-state image pickup device and a corresponding multiplication gain of charge signals in the electron multiplier section are adjusted.

Herein, the noise standard deviation acquired as described above has a predetermined correlation with the multiplication gain of the charge signals in the image pickup device in which the noise image is acquired. Therefore, by performing gain adjustment by using this noise standard deviation as an index and referring to the way of change of the noise standard deviation acquired at the time of gain adjustment with respect to the reference standard deviation, the multiplication gain of the charge signals in the electron multiplying solid-state image pickup device can be accurately re-adjusted. In such a method, a stable light source or the like becomes unnecessary at the time of adjustment, so that the gain adjustment can be easily performed on the user's side.

According to the imaging apparatus and the gain adjusting method for the imaging apparatus of the present invention, concerning a multiplication gain of charge signals in the electron multiplying solid-state image pickup device, a standard deviation of intensity data in a noise image acquired under a predetermined condition is used as an index of gain adjustment, and based on a comparison result between a reference standard deviation and a noise standard deviation acquired at the time of gain adjustment, the multiplication gain of the charge signals in the electron multiplier section of the solid-state image pickup device is adjusted, whereby it becomes possible to easily and accurately re-adjust the multiplication gain of the charge signals in the image pickup device on the user's side.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 9 is a flowchart showing a gain adjusting method for the imaging apparatus.

DESCRIPTION OF THE PREFERRED EMBODIMENTS

Hereinafter, preferred embodiments of an imaging apparatus and a gain adjusting method for the imaging apparatus of the present invention will be described in detail with reference to the drawings. In the description of the drawings, the identical components are attached with the same symbols, and overlapping description will be omitted. The dimensional ratios of the drawings are not necessarily equal to those described.

Figure 1:
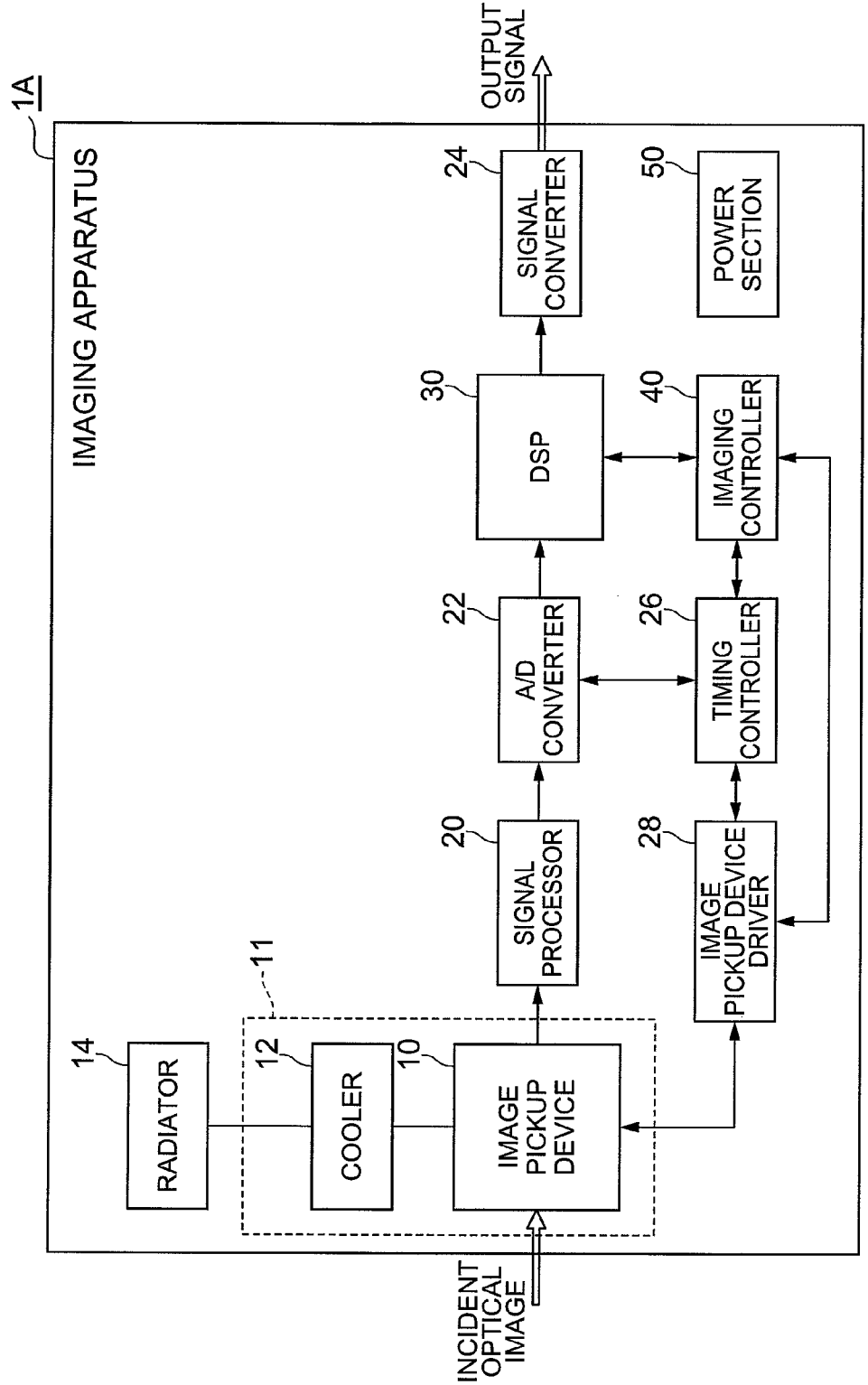
FIG. 1 is a block diagram showing a configuration of an embodiment of an imaging apparatus.

FIG. 1 is a block diagram showing a configuration of an embodiment of an imaging apparatus of the present invention. An imaging apparatus 1A of this embodiment includes an electron multiplying image pickup device 10. This image pickup device 10 is a solid-state image pickup device which has a plurality of arrayed pixels, outputs charge signals generated in accordance with light incident amounts in respective pixels, and has an electron multiplier section which multiplies the charge signals.

Figure 2:
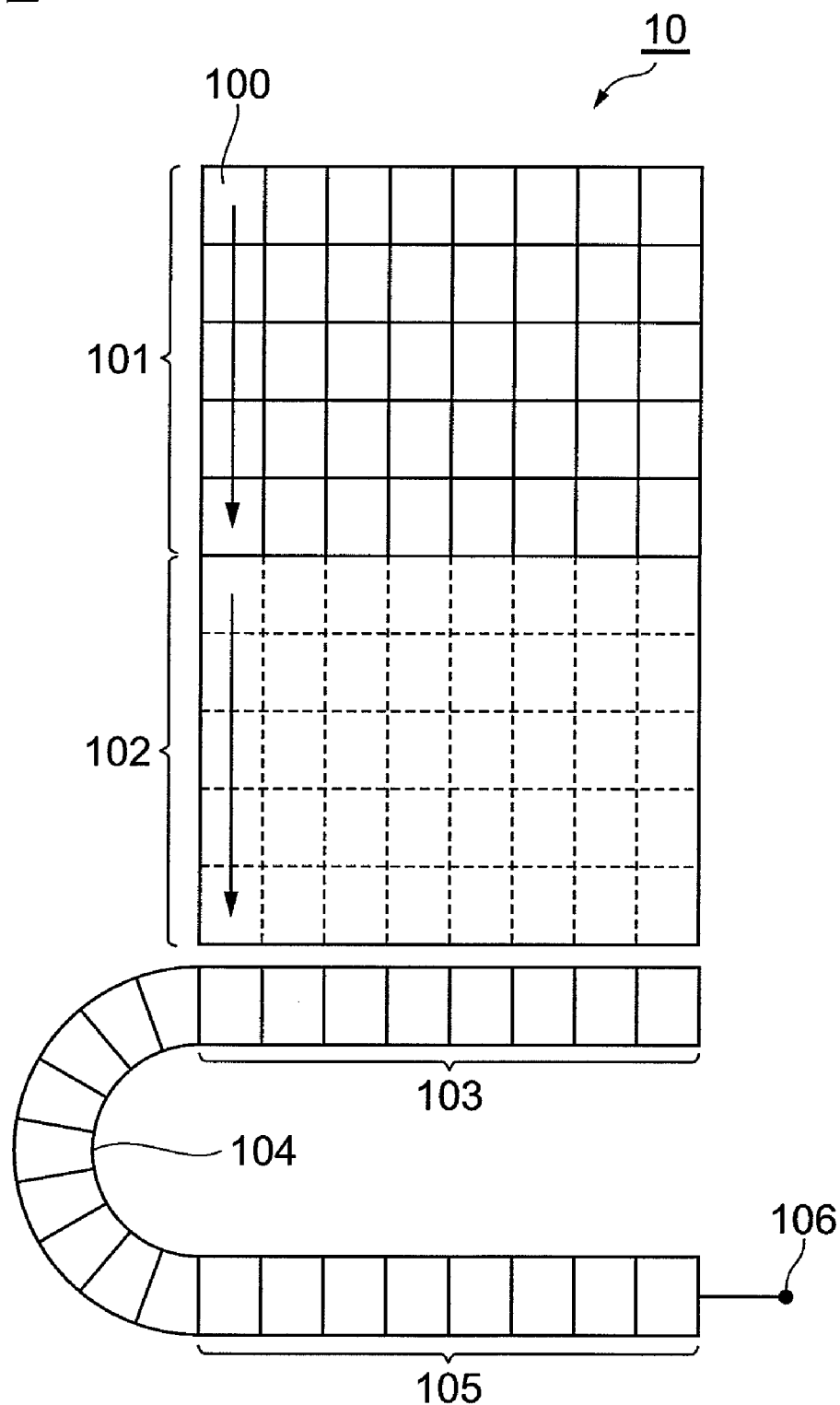
FIG. 2 is a schematic view showing an example of a configuration of an electron multiplying solid-state image pickup device.

FIG. 2 is a schematic view showing an example of a configuration of the electron multiplying solid-state image pickup device. The image pickup device 10 shown in FIG. 2 is constructed as a FT (frame transfer) type CCD including an imaging section 101 and an accumulating section 102 formed by vertical shift registers, and a horizontal shift register 103. The imaging section 101 to be used for acquiring an image according to an incident optical image is structured so as to include a plurality of two-dimensionally arrayed unit pixels 100.

The accumulating section 102 has a two-dimensional pixel structure similar to that of the imaging section 101, and is provided between the imaging section 101 and the horizontal shift register 103. The accumulating section 102 is masked by a nontransparent metal or the like and is not used for detection of an optical image, and is used for accumulating charges generated in the respective pixels 100 of the imaging section 101 and transferring charges to the horizontal shift register 103. The number of pixels in a matrix in the imaging section 101 and the accumulating section 102 may be arbitrarily set, and for example, a configuration including 512×512 pixels can be used.

In the FT-type CCD 10 having this configuration, first, when an optical image is made incident on the imaging section 101, charges corresponding to the incident light are generated in the plurality of pixels 100, respectively, whereby image acquisition is performed. Next, charge signals generated in the respective pixels 100 of the imaging section 101 are transferred vertically to the accumulating section 102 and the charge signals of image data acquired by the imaging section 101 are accumulated in the accumulating section 102. Subsequently, charge signal reading is performed by the accumulating section 102 and the horizontal shift register 103 as an output register.

In the configuration example shown in FIG. 2, in addition to the horizontal shift register 103, a multiplier register 105 as an electron multiplier section having an electron multiplying function is provided. Thereby, this CCD 10 is constructed as an electron multiplying CCD (EM-CCD) capable of multiplying charge signals by a predetermined multiplication gain by transferring charges by applying a voltage as a multiplying voltage higher than normal to the multiplier register 105. In this configuration, charge signals transferred from the respective pixels 100 of the imaging section 101 to the horizontal shift register 103 are further transferred to the multiplier register 105 via the connection register 104, whereby they are multiplied by a predetermined gain, and obtained multiplied charge signals are outputted as image data from an output terminal 106.

The detailed structure of the electron multiplying solid-state image pickup device 10 to be used in the imaging apparatus 1A is not limited to the structure shown in FIG. 2, and may be other structures. For example, in FIG. 2, the FT-type EM-CCD having the imaging section 101 and the accumulating section 102 is illustrated as the image pickup device 10, however, it may be constructed as an FFT (full-frame transfer) type EM-CCD in which the accumulating section 102 is not provided.

In the configuration shown in FIG. 1, for this electron multiplying solid-state image pickup device 10, a cooler 12 and a radiator 14 are provided. The cooler 12 is cooling means for reducing dark current noise or the like by maintaining the image pickup device 10 in a state that it is cooled to a predetermined temperature. As this cooler 12, for example, an electron cooling device such as a peltiert device can be preferably used.

The radiator 14 is connected to the radiation side of the cooler 12, and radiates heat by convection by using a fan or water circulation. In this configuration, for improvement in cooling performance and handling ease, it is preferable that the image pickup device 10 and the cooler 12 are sealed within a vacuum sealed tube 11 as schematically shown by the dashed line in FIG. 1. As the cooler 12, in detail, cooling means other than the peltiert device may be used.

In the imaging apparatus 1A shown in FIG. 1, for the electron multiplying solid-state image pickup device 10 shown in FIG. 2, a signal processor 20, an A/D converter 22, a digital signal processor (DSP) 30, and a signal converter 24 are provided. The signal processor 20 is analog signal processing means for applying necessary signal processing to analog charge signals outputted from the image pickup device 10. For example, this signal processor 20 DC-restores analog video signals outputted from the image pickup device 10 and amplifies the analog signals so that they have amplitude suitable for A/D conversion at a subsequent stage.

The A/D converter 22 converts the analog video signals that were outputted from the image pickup device 10 and DC-restored and amplified in the signal processor 20 into digital video signals. The digital signals outputted from the A/D converter 22 are subjected to necessary signal processing in the DSP 30 and then inputted into the video signal converter 24. The DSP 30 is digital signal processing means for applying signal processing to the digital signals from the A/D converter 22. The signal converter 24 adds horizontal and vertical video synchronization signals to the digital signals as image data, and generates digital video signals as output signals to be outputted to the outside from the imaging apparatus 1A.

For these image pickup device 10, signal processor 20, A/D converter 22, DSP 30, and signal converter 24, in the imaging apparatus 1A, an imaging controller 40, a timing controller 26, and an image pickup device driver 28 are further provided. The imaging controller 40 includes a CPU for executing imaging control processing, and is control means for controlling operations of the respective parts including the DSP 30, the timing controller 26, and the image pickup device driver 28 of the imaging apparatus 1A.

The timing controller 26 generates and outputs timing signals necessary for operations of the solid-state image pickup device 10 and the A/D converter 22, etc. The image pickup device driver 28 drives and controls the electron multiplying solid-state image pickup device 10. In detail, the image pickup device driver 28 controls the charge transfer in the imaging section 101, the accumulating section 102, and the respective registers 103, 104, and 105 and controls a multiplication condition such as a voltage applying condition to the multiplier register 105 by referring to timing signals from the timing controller 26, and if necessary, instruction signals from the imaging controller 40. A voltage necessary for operating the respective parts of the imaging apparatus 1A is supplied from a power section 50.

Figure 3:
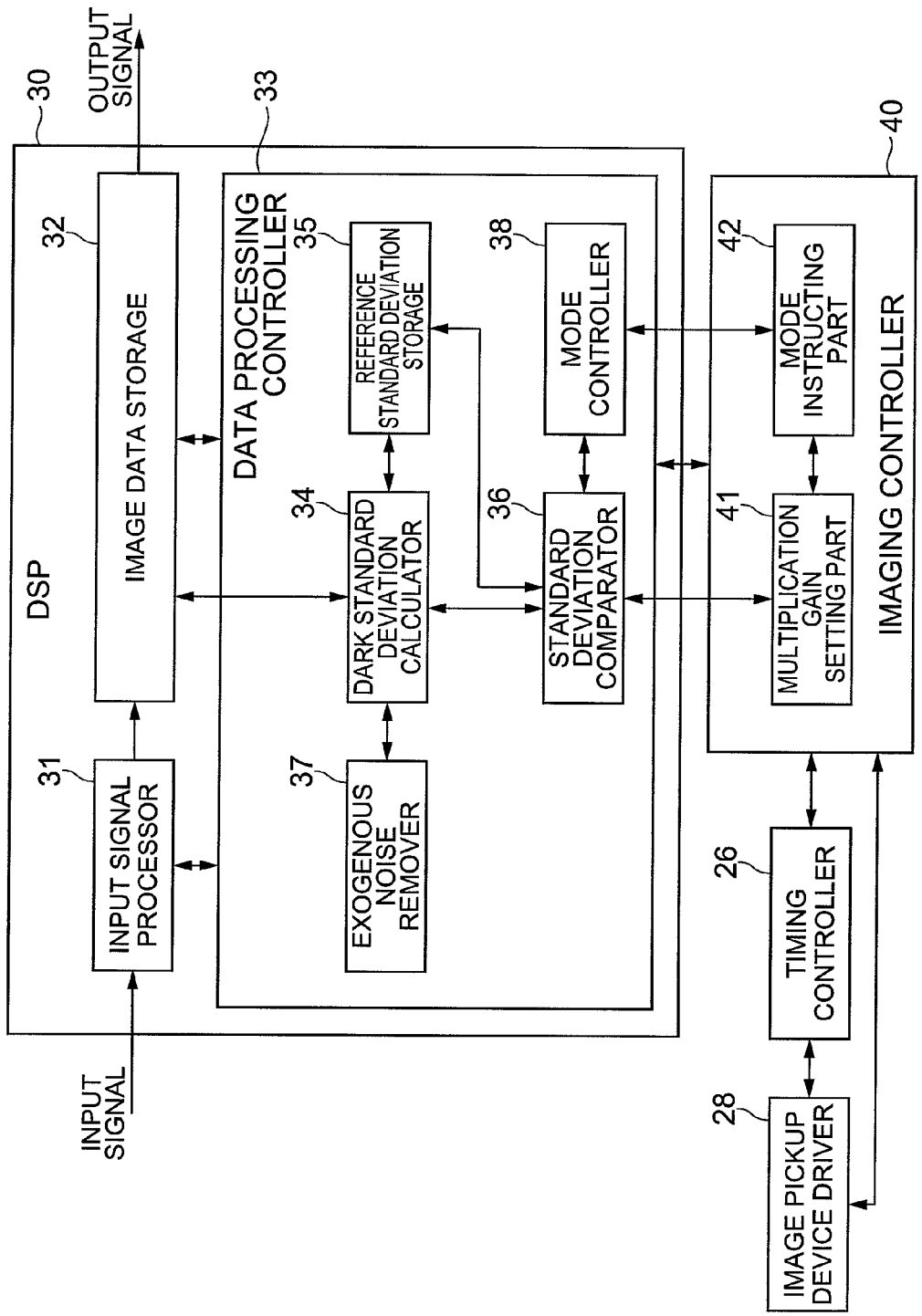
FIG. 3 is a block diagram showing configurations of a DSP and an imaging controller in the imaging apparatus.

The configuration of the imaging apparatus 1A of this embodiment will be further described. FIG. 3 is a block diagram showing an example of detailed configurations of the DSP (digital signal processor) 30 and the imaging controller 40 in the imaging apparatus 1A shown in FIG. 1. In the configuration shown in FIG. 3, the DSP 30 includes an input signal processor 31, an image data storage 32, and a data processing controller 33. This DSP 30 includes, for example, a DSP core which realizes functions of the data processing controller 33, a program memory, a data memory that serves as an image data storage 32, input/output ports necessary for inputting and outputting signals, and so on. In detail, as the configuration of the DSP 30, various configurations may be used.

In this DSP 30, digital signals inputted from the A/D converter 22 into the DSP 30 are subjected to necessary signal processing in the input signal processor 31 and then stored in the image data storage 32, and outputted to the signal converter 24 at a subsequent stage. Signal processing to be executed in the input signal processor 31 includes, for example, noise removal processing from a normal image. The input signal processor 31 may not be provided if it is not necessary.

The data processing controller 33 controls operations of the input signal processor 31 and data input/output operations in the image data storage 32. The data processing controller 33 applies predetermined image processing to image data stored in the image data storage 32 as appropriate. In the imaging apparatus 1A of this embodiment, two modes of a normal imaging mode and a gain adjusting mode are prepared as imaging modes. Corresponding to this, the data processing controller 33 is provided with a mode controller 38, and this mode controller 38 performs setting and switching of the imaging modes.

In the DSP 30 in the configuration example shown in FIG. 3, to execute an operation for adjusting the multiplication gain in the image pickup device 10 in the gain adjusting mode, the data processing controller 33 is provided with a dark standard deviation calculator 34, a reference standard deviation storage 35, a standard deviation comparator 36, and an exogenous noise remover 37. Among these, for the reference standard deviation storage 35, a memory (for example, data memory) constituting the DSP 30 is used as the storage.

In this imaging apparatus 1A, a configuration is employed in which in the gain adjusting mode, the multiplication gain of charge signals in the multiplier register 105 as an electron multiplier section of the image pickup device 10 is adjusted by using a noise image acquired under a predetermined imaging condition by the electron multiplying solid-state image pickup device 10. As such a noise image, a dark output image by dark current noise acquired under a dark condition by the image pickup device 10 is preferably used.

The dark standard deviation calculator 34 is standard deviation calculating means for calculating a standard deviation of intensity data (corresponding to intensity data of charge signals according to a dark current) in a plurality of pixel components of a dark output image as a noise image acquired by the image pickup device 10 in the gain adjusting mode. A standard deviation calculated by this dark standard deviation calculator 34 is a dark standard deviation that is used as a noise standard deviation for gain adjustment. The reference standard deviation storage 35 is reference standard deviation storing means for storing a reference standard deviation acquired in advance as a dark standard deviation that becomes a reference for gain adjustment.

The standard deviation comparator 36 is standard deviation comparing means which, at the time of gain adjustment that is executed upon setting the gain adjusting mode, compares a dark standard deviation calculated by the dark standard deviation calculator 34 and a reference standard deviation readout from the reference standard deviation storage 35 and outputs an obtained comparison result. The acquisition of the dark output image and calculation of the standard deviation in the gain adjustment may be repeated a plurality of times. In this case, a dark standard deviation for gain adjustment is calculated by the dark standard deviation calculator 34 from, for example, an average of standard deviations of a plurality of dark output images acquired.

For the dark standard deviation calculator 34 for calculating a standard deviation of a dark output image, the exogenous noise remover 37 is provided. The exogenous noise remover 37 is exogenous noise removing means for removing image data which contains exogenous noise such as spot noise caused by cosmic rays and is inadequate for gain adjustment from the dark output image acquired by the solid-state image pickup device 10 as a dark output image from which the dark standard deviation for gain adjustment is calculated. However, such an exogenous noise remover 37 may not be provided if it is not necessary.

For the DSP 30 thus configured, the imaging controller 40 includes a multiplication gain setting part 41 and a mode instructing part 42. The mode instructing part 42 instructs the mode controller 38 of the DSP 30 to set and switch the normal imaging mode and the gain adjusting mode described above. These setting and switching of the imaging modes are performed, for example, in response to an instruction from an operator by using an imaging mode set button or the like.

The multiplication gain setting part 41 is multiplication gain setting means for setting a multiplication gain of charge signals by setting a multiplication condition for the electron multiplier section of the solid-state image pickup device 10. In the image pickup device 10 constructed as shown in FIG. 2, the multiplication gain setting part 41 sets a multiplication gain of charge signals by setting a voltage applying condition to the multiplier register 105 as a multiplication condition for the electron multiplier section, via the timing controller 26 and the image pickup device driver 28.

In the normal imaging mode, the multiplication gain setting part 41 reads a multiplication condition set and stored at the time of shipping of the imaging apparatus 1A or a multiplication condition reset and stored at the time of previous gain adjustment, and based on the multiplication condition, sets a multiplication gain of charge signals in the multiplier register 105 of the image pickup device 10.

On the other hand, in the gain adjusting mode, the multiplication gain setting part 41 adjusts and resets the multiplication gain in the multiplier register 105 of the image pickup device 10 according to a predetermined gain adjusting method. In detail, in the multiplication gain setting part 41, the comparison result between the dark standard deviation and the reference standard deviation performed in the standard deviation comparator 36 of the DSP 30 is inputted. The multiplication gain setting part 41 adjusts the multiplication gain based on this comparison result by the standard deviation comparator 36, and resets and stores an obtained voltage applying condition, etc., as a new multiplication condition.

The effects of the imaging apparatus of the above-described embodiment and the gain adjusting method to be applied to the imaging apparatus will be described.

In the imaging apparatus 1A shown in FIG. 1 to FIG. 3 and its gain adjusting method, for the multiplication gain of charge signals in the imaging apparatus 1A including an EM-CCD as an electron multiplying solid-state image pickup device 10, a standard deviation in an image of intensity data in a noise image acquired by the image pickup device 10 under a predetermined condition is used as an index of gain adjustment. Then, the reference standard deviation prepared in advance in the storage 35 and a noise standard deviation acquired and calculated by the calculator 34 at the time of gain adjustment are compared by the comparator 36, and based on a result of this comparison, a multiplication condition such as a voltage applying condition to the multiplier register 105 as an electron multiplier section of the image pickup device 10 and a multiplication gain of charge signals in the image pickup device 10 are adjusted.

Figure 4:
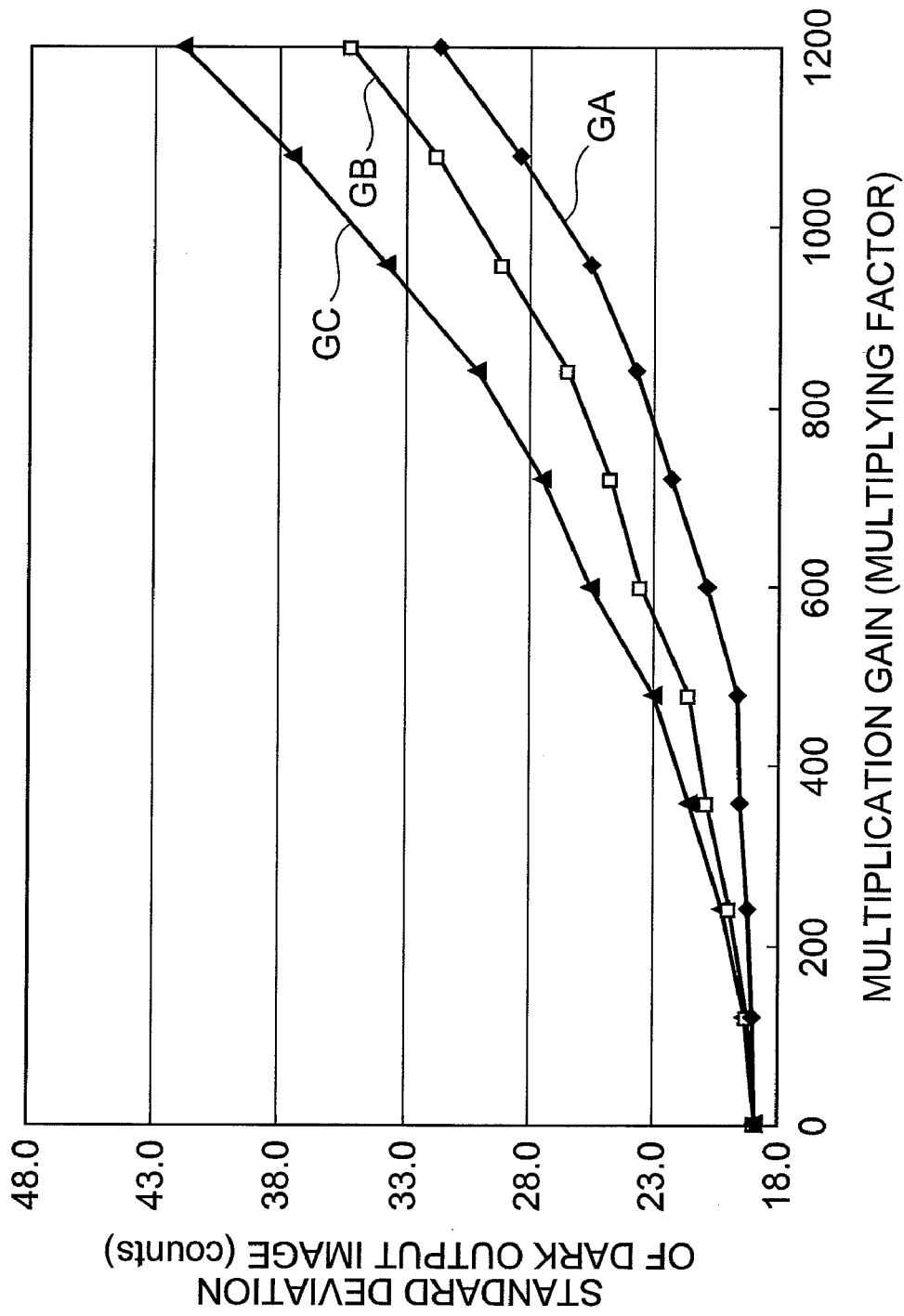
FIG. 4 is a graph showing correlations between multiplication gains and standard deviations of dark output images.

Herein, the noise standard deviation acquired as described above has a certain correlation with the multiplication gain of charge signals in the image pickup device 10 in which a noise image was acquired. FIG. 4 is a graph showing a correlation between the multiplication gain and standard deviation of a dark output image in EM-CCD. Herein, as the EM-CCD camera, three cameras A, B, and C are prepared, and correlations between the multiplication gains (multiplying factor) and dark standard deviations (counts) obtained in the respective cameras are shown by the graphs GA, GB, and GC.

In an EM-CCD camera, due to the principle of electron multiplication, the electron multiplication gain and fluctuation of output image data have a predetermined correlation with each other. Therefore, concerning a dark output image, when standard deviations showing fluctuations of image data in a plurality of pixel components constituting the images are obtained, as shown in FIG. 4, as the multiplication gain increases, the dark standard deviation also increases. As for the correlation between the multiplication gain and the dark standard deviation, the correlation characteristics differ among the individual imaging apparatus as shown by the three graphs GA, GB, and GC of FIG. 4.

Therefore, by using the noise standard deviation such as this dark standard deviation or the like as an index, a standard deviation that becomes a reference for the target imaging apparatus 1A is acquired in advance, and gain adjustment is performed by referring to the change in noise standard deviation acquired at the time of gain adjustment from the reference standard deviation, the multiplication gain of charge signals in the electron multiplying solid-state image pickup device 10 can be accurately re-adjusted. In this method, a stable light source or the like becomes unnecessary during adjustment, so that gain adjustment can be easily made on the user's side.

In the above-described configuration, as a noise image to be used for gain adjustment of the electron multiplying image pickup device 10, in detail, as in the configuration example shown in FIG. 3, a dark output image by dark current noise acquired under a dark condition by the image pickup device 10 is preferably used. By using such a dark output image for gain adjustment, the adjustment of the multiplication gain of charge signals can be highly accurately executed by using the correlation between the dark standard deviation and the multiplication gain shown in FIG. 4.

In addition, in the configuration example shown in FIG. 3, for the standard deviation calculator 34, an exogenous noise remover 37 for removing image data containing exogenous noise from a noise image acquired by the image pickup device 10 as a noise image (dark output image) to be used for calculating a noise standard deviation in the standard deviation calculator 34 is provided. Thereby, the accuracy of gain adjustment of the solid-state image pickup device 10 can be improved. It is also possible that this exogenous noise removal is performed in the input signal processor 31 in the configuration of FIG. 3. If the exogenous noise removal is not necessary, the exogenous noise remover 37 may not be provided.

As a detailed method for gain adjustment of the image pickup device 10 to be performed by the standard deviation comparator 36 and the multiplication gain setting part 41, it is preferable that the multiplication gain is adjusted so that, in the comparison result between the dark standard deviation and the reference standard deviation in the standard deviation comparator 36, the dark standard deviation substantially coincides with the reference standard deviation. As a detailed method in this case, the following method can be used: a value range of standard deviations permissible with respect to the reference standard deviation is set, and the multiplication condition and the multiplication gain are adjusted so that the acquired dark standard deviation falls within the permissible range.

As a detailed hardware configuration of the imaging apparatus 1A, in the configuration example shown in FIG. 1 and FIG. 3, the imaging apparatus 1A is configured by using the DSP (digital signal processor) 30 including the dark standard deviation calculator 34, the reference standard deviation storage 35, and the standard deviation comparator 36. By thus using digital signal processing means such as the DSP, an imaging apparatus having the above-described gain adjusting function can be preferably realized.

Herein, in Document 1, it is described that a dark current or clock induced charge (CIC) is used for the multiplication gain measurement in the EM-CCD. In detail, there is described a method (Method 1) in which a dark current or the like is measured under a condition that does not realize electron multiplication and under a condition involving electron multiplication being activated, and by using a ratio of these, a multiplication gain is measured, and a method (Method 2) in which a multiplication gain is measured by using a statistical distribution of discrete simple events caused by a dark current or the like.

However, in Method 1 of the above-described methods, it is described that measurement is performed by increasing the dark current or CIC over a level in normal use, however, in this method, a function for operating according to a special drive method for increasing the dark current or the like must be installed in the imaging apparatus. In Method 2, a statistical distribution of simple events is used, so that calculation, etc., necessary for measuring the multiplication gain such as setting of a threshold for identifying the simple events are complicated.

On the other hand, in the imaging apparatus 1A of the above-described embodiment, concerning the multiplication gain of charge signals in the electron multiplying solid-state image pickup device 10, a standard deviation in a noise image acquired under a predetermined condition is used as an index, and the multiplication gain is adjusted based on a comparison result between the reference standard deviation and the standard deviation acquired at the time of gain adjustment. Thereby, without requiring a special drive method, etc., for the image pickup device 10, the multiplication gain of charge signals in the multiplier register 105 of the image pickup device 10 can be easily re-adjusted on the user's side.

The configuration of the imaging apparatus 1A of the present invention will be further described along with a detailed gain adjusting method to be executed in the imaging apparatus 1A. In the following description, an example in which a dark current output image by dark current noise acquired under a dark condition by the solid-state image pickup device 10 is used as a noise image for gain adjustment will be described.

Figure 5:
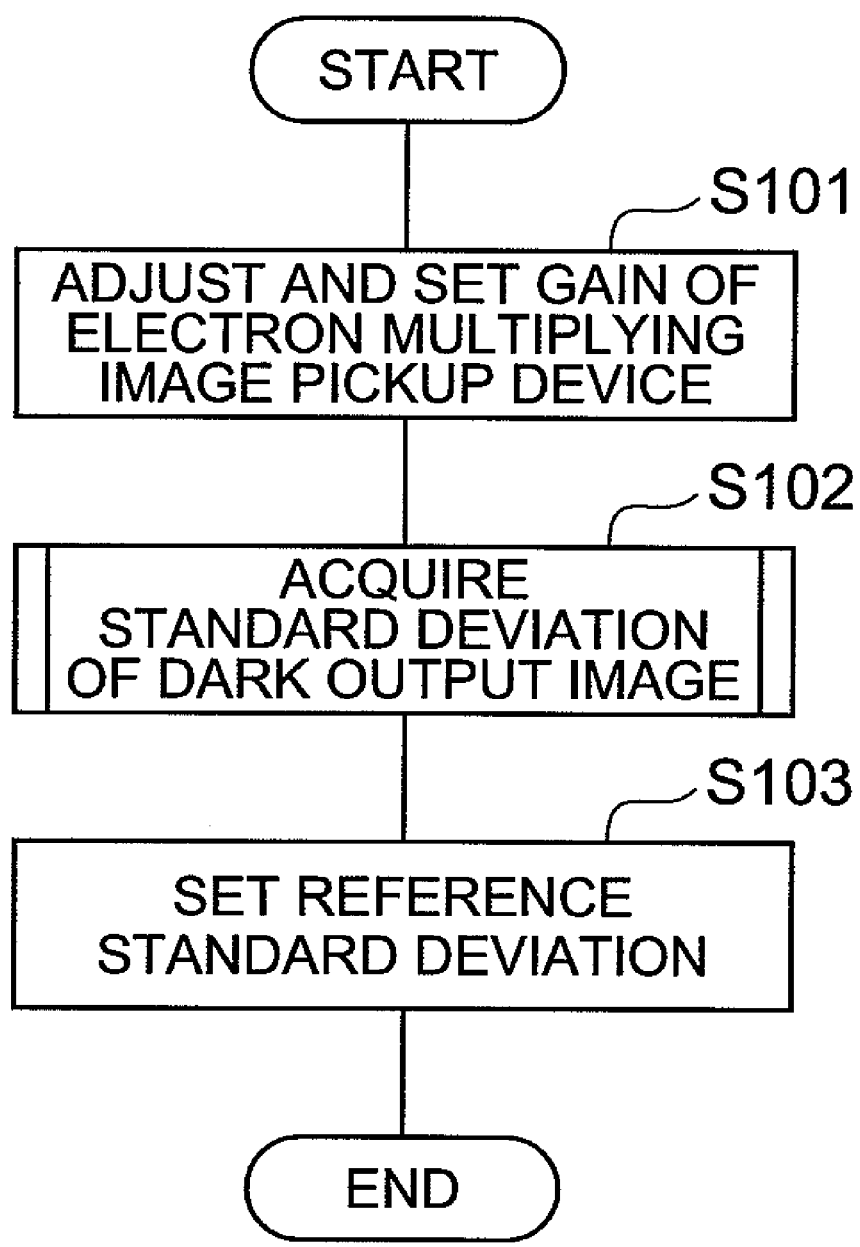
FIG. 5 is a flowchart showing a gain setting method in the imaging apparatus.

FIG. 5 is a flowchart showing a gain setting method of the imaging apparatus 1A. Gain setting in the image pickup device 10 shown in FIG. 5 is performed, for example, for setting a default multiplication condition, etc., before shipping the imaging apparatus 1A from the factory.

In the gain setting to be executed before shipping the imaging apparatus 1A, first, image acquisition is performed under a predetermined imaging condition for gain setting by using a light source or the like having a stable luminance, and the multiplication gain of charge signals in the electron multiplying image pickup device 10 and a multiplication condition such as a voltage applying condition to the multiplier register 105 in this case are adjusted. Then, a multiplication condition under which a desired multiplication gain is finally obtained is set as an initial value multiplication condition and stored in the memory (Step S101).

Next, in a state that the multiplication gain is thus correctly adjusted in the image pickup device 10, a standard deviation of a dark output image is acquired (S102). Then the dark standard deviation acquired herein is stored in the reference standard deviation storage 35 as a reference standard deviation to be referred to at the time of gain adjustment after shipping the imaging apparatus 1A (S103).

Figure 6:
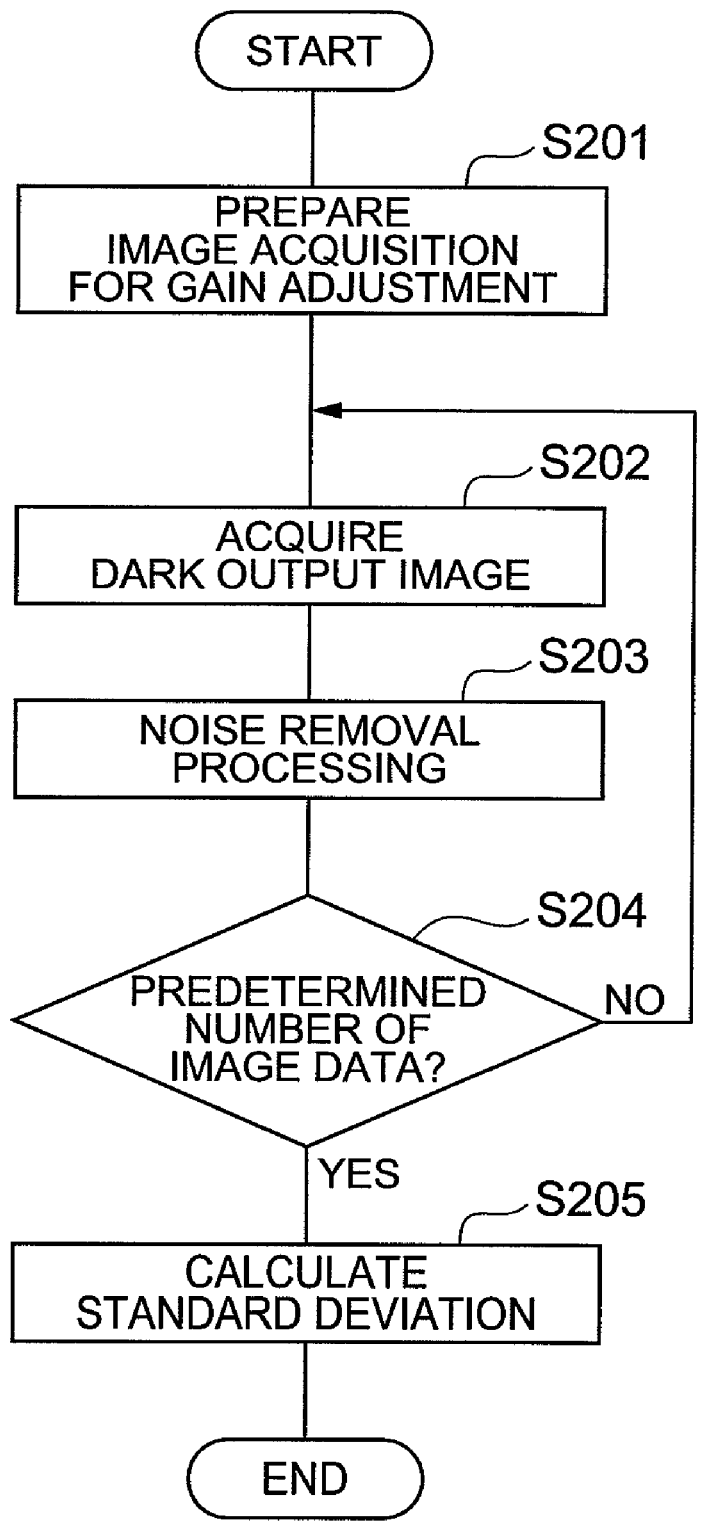
FIG. 6 is a flowchart showing a method for acquiring a standard deviation of a dark output image.

Preferably, the acquisition of the dark standard deviation at Step S102 of FIG. 5 is performed according to the method for acquiring a standard deviation of a dark output image shown in the flowchart of FIG. 6. In this acquiring method, first, preparation for acquiring a dark output image to be used for gain adjustment under a predetermined dark condition is made (Step S201). In detail, a condition that prevents incidence of light on the image pickup device 10 from the outside by attaching a lens cap to the lens of the imaging apparatus 1A is set. In addition, a cooling temperature of the image pickup device 10 is stabilized to a constant temperature set for gain adjustment.

Next, a dark output image by dark current noise is acquired by the image pickup device 10 under the dark condition (S202). In addition, for the acquired dark output image, image data caused by exogenous noise such as spot noise due to cosmic rays is removed by the exogenous noise remover 37 of the DSP 30 (S203, exogenous noise removal step). This exogenous noise removal processing may not be performed if it is not necessary.

Subsequently, it is confirmed whether a predetermined number of image data of dark output images were acquired (S204), and if the number has not reached the necessary number of image data, Steps S202 and S203 are repeated. If the necessary number of image data is reached, acquisition of dark output images is ended, and in the dark standard deviation calculator 34, a dark standard deviation as a standard deviation of intensity data in the images is calculated (S205).

To increase the accuracy of the standard deviation to be calculated in the above-described processing, when a dark standard deviation is obtained from a plurality of dark output images, for example, an average of standard deviations obtained for each of the plurality of images can be regarded as a dark standard deviation. When only one dark output image is used for calculation of a dark standard deviation, Step S204 may be omitted in the acquiring method shown in FIG. 6.

Figure 7:
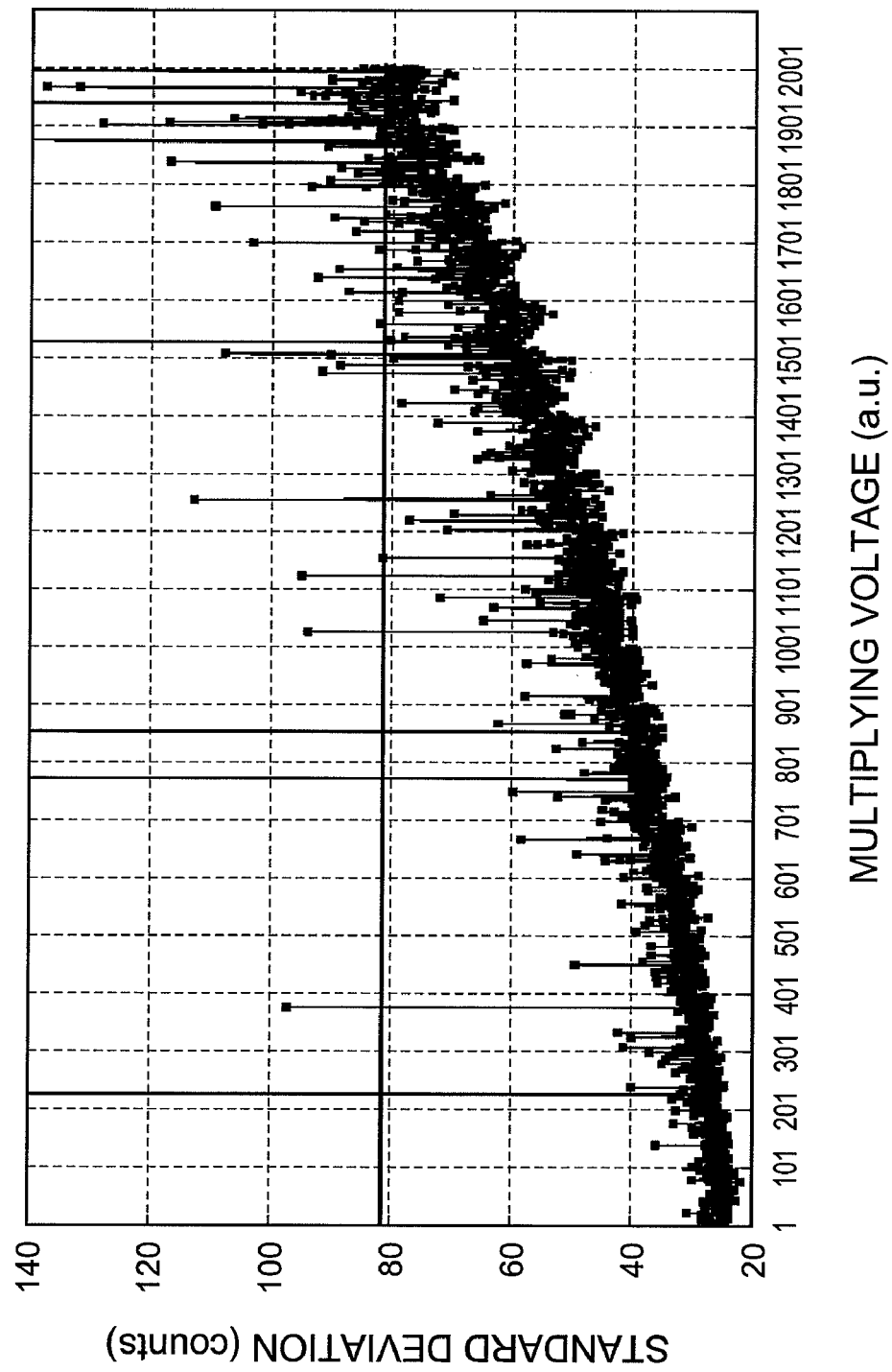
FIG. 7 is a graph showing a correlation between multiplying voltage and standard deviation of a dark output image in a state that exogenous noise removal is not performed.
Figure 8:
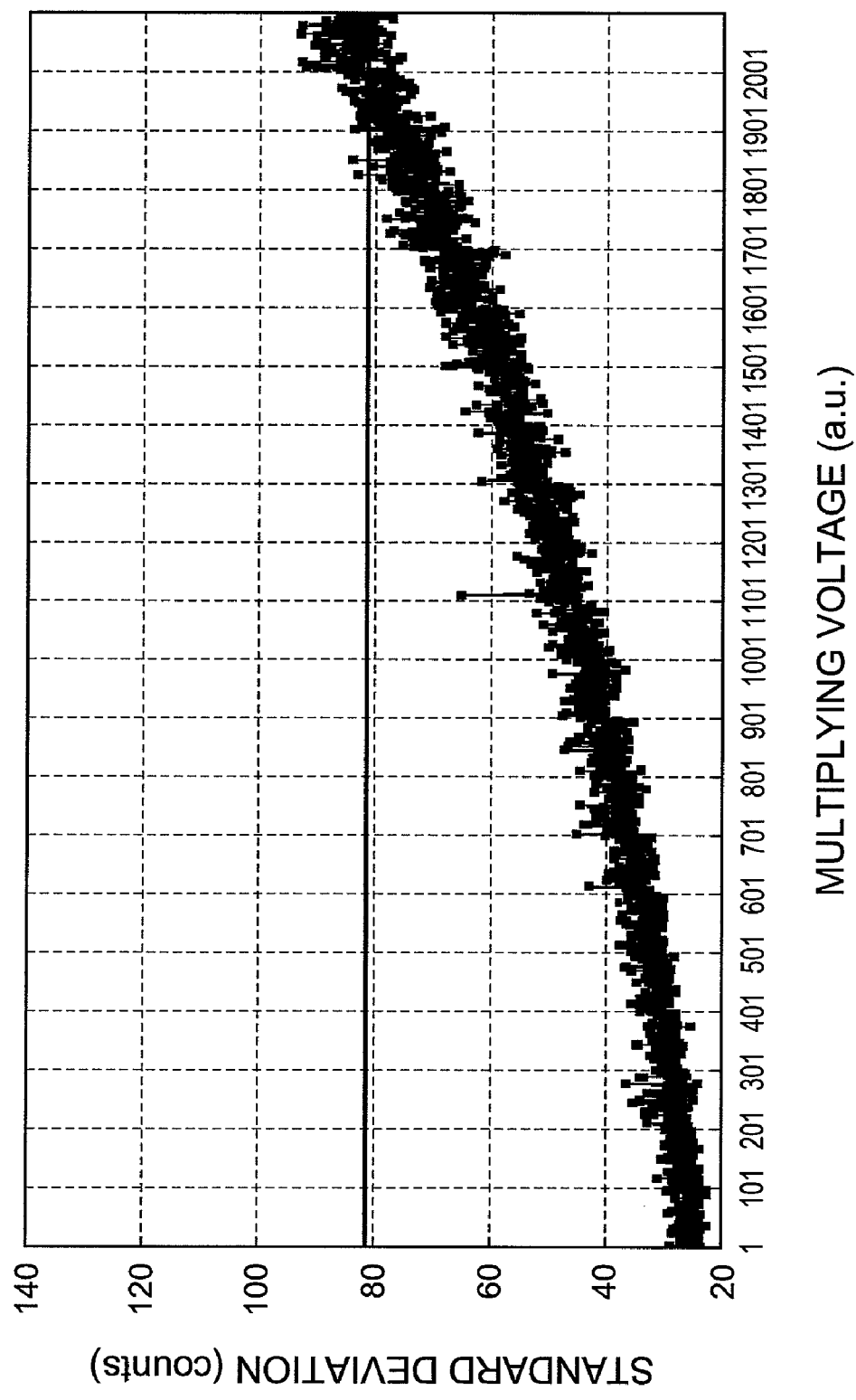
FIG. 8 is a graph showing a correlation between multiplying voltage and standard deviation of a dark output image in a state that exogenous noise removal is performed.

Herein, exogenous noise removal processing to be subjected to the dark output image will be described. FIG. 7 is a graph showing a correlation between multiplying voltage and dark standard deviation in a state that the exogenous noise removal is not performed. FIG. 8 is a graph showing a correlation between multiplying voltage and dark standard deviation in a state that the exogenous noise removal is performed. In the graphs of FIG. 7 and FIG. 8, the horizontal axis indicates a multiplying voltage (a.u., corresponding to a set value for a D/A converter to be used for voltage application), and the vertical axis indicates standard deviation (counts) of dark output image. These graphs show examples in the case where the multiplying voltage for the image pickup device 10 is gradually increased, and gain adjustment is performed so that the dark standard deviation becomes about 80 counts.

As shown in the graph of FIG. 7, when the multiplying voltage is increased in a state that the exogenous noise removal is not performed, the dark standard deviation increases accordingly, however, at some points, standard deviation values great like spikes are measured. These are caused by spot noise, etc., due to cosmic rays. The existence of such great exogenous noise causes adjustment errors in gain adjustment that is performed by referring to the dark standard deviation by dark current noise, so that there is a possibility that gain adjustment cannot be performed with sufficient accuracy.

On the other hand, as shown in the graph of FIG. 8, by performing exogenous noise removal processing for removing image data in which standard deviation values great like spikes were measured, the accuracy of gain adjustment using the dark standard deviation can be improved. As a detailed method for this exogenous noise removal, for example, a method can be used in which a threshold is set for intensity data of respective pixels in the image, and intensity data equal to or more than the threshold is regarded as spot noise and excluded from the calculation of standard deviation. In the exogenous noise removal, when generation of exogenous noise is confirmed by means of application of a threshold, etc., the method for excluding the image portion including the generation of exogenous noise in the dark output image or the method for excluding the dark output image itself from the gain adjustment processing can be used.

Next, gain adjustment of electron multiplication in the image pickup device 10, to be performed for the imaging apparatus 1A, will be described. FIG. 9 is a flowchart showing a gain adjusting method of the imaging apparatus 1A. Such gain adjustment of the image pickup device 10 is executed, for example, by a user who is using this imaging apparatus 1A after shipping the imaging apparatus 1A as appropriate such as in the case where the multiplication gain of the image pickup device 10 lowers.

For re-adjustment of the gain of the imaging apparatus 1A, first, selection of the gain adjusting mode is instructed by an operator via the mode instructing part 42, and the gain adjusting mode is set in the mode controller 38 of the DSP 30 (Step S301). Then, acquisition of the dark output image to be used for gain adjustment and calculation of the dark standard deviation by the dark standard deviation calculator 34 are performed (Step S302, standard deviation calculation step). This acquisition of the dark standard deviation is performed according to the same dark standard deviation acquiring method as in the case of gain setting shown in the flowchart of FIG. 6. With respect to this dark standard deviation, the reference standard deviation that will be referred to for gain adjustment is readout from the reference standard deviation storage 35 (S303, reference standard deviation reading-out step).

Next, in the standard deviation comparator 36, a dark standard deviation calculated by the dark standard deviation calculator 34 and a reference standard deviation readout from the reference standard deviation storage 35 are compared to each other, and an obtained result of this comparison is outputted to the multiplication gain setting part 41 (S304, standard deviation comparison step). The multiplication gain setting part 41 adjusts the multiplication gain of the electron multiplier section of the image pickup device 10 based on the inputted comparison result by the standard deviation comparator 36 (multiplication gain adjustment step).

In detail, the multiplication gain setting part 41 judges whether the comparison result by the standard deviation comparator 36 satisfies a predetermined condition (S305). As a detailed judging method to be used herein, for example, a method in which a permissible standard deviation value range with respect to the reference standard deviation is set in advance, and it is judged whether the value of the acquired dark standard deviation is within the permissible range, can be used. When it is judged that the condition is satisfied, it is judged that the multiplication gain adjustment is not necessary (S306) and the gain adjustment processing is ended.

On the other hand, when it is judged that the dark standard deviation does not satisfy the condition, a multiplication condition such as a voltage applying condition to the multiplier register 105 of the image pickup device 10 is changed according to a predetermined change condition so that the dark standard deviation approaches the reference standard deviation (S311). Then, the acquisition of the dark standard deviation (S312) and the comparison of the dark standard deviation with the reference standard deviation (S313) are performed again, and it is judged whether an obtained comparison result satisfies the predetermined condition (S314). When it is judged that the dark standard deviation does not satisfy the condition, Steps S311, S312, and S313 are repeated. When it is judged that the dark standard deviation satisfies the condition, the multiplication condition in this case is reset as a new multiplication condition (S315), and then the gain adjustment processing is completed (S316).

This gain adjustment processing may be automatically performed or may be manually performed by an operator. For changing the multiplication condition when the dark standard deviation acquired at the time of gain adjustment does not satisfy the condition, when the multiplication gain lowers due to the use of the imaging apparatus 1A, a method in which the multiplying voltage is increased by a predetermined amount of change in a direction in which the dark standard deviation approaches the reference standard deviation (initial value) can be used.

As a detailed method, a method in which feed-back control is performed so as to raise the multiplying voltage at equal intervals of predetermined voltage values, a method in which feed-back control is performed so as to raise the multiplying voltage at large intervals at the beginning and at small intervals when it approaches the initial value, or a method in which the multiplying voltage is determined by referring to the table of standard deviation—multiplying voltage—multiplication gain, recorded in advance, can be used.

The imaging apparatus and the gain adjusting method for the imaging apparatus of the present invention are not limited to the above-described embodiments and configuration examples, and various modifications are possible. For example, the detailed hardware configuration of the imaging apparatus is not limited to the configuration shown in FIG. 1 to FIG. 3, and various configurations may be used as appropriate. In the above-described embodiment, the dark standard deviation calculator 34, the reference standard deviation storage 35, and the standard deviation comparator 36 are realized in the digital signal processing means such as the DSP 30, and the multiplication gain setting part 41 is realized in the imaging controller 40, however, other than these, various configurations may be used as long as these functions can be realized.

Herein, the imaging apparatus of the above-described embodiment includes: (1) an electron multiplying solid-state image pickup device which has a plurality of arrayed pixels, outputs charge signals generated in the respective pixels, and has an electron multiplier section which multiplies the charge signals; (2) multiplication gain setting means for setting a multiplication gain for the charge signals by setting a multiplication condition for the electron multiplier section of the solid-state image pickup device; (3) standard deviation calculating means for calculating a standard deviation of a noise image acquired under a predetermined imaging condition by the solid-state image pickup device as a noise standard deviation for gain adjustment; (4) reference standard deviation storing means storing a reference standard deviation acquired in advance as a noise standard deviation that becomes a reference for gain adjustment; and (5) standard deviation comparing means for comparing a noise standard deviation calculated by the standard deviation calculating means at the time of gain adjustment and a reference standard deviation stored in the reference standard deviation storing means and outputs an obtained comparison result, wherein (6) at the time of gain adjustment, the multiplication gain setting means adjusts the multiplication gain based on the comparison result by the standard deviation comparing means.

The gain adjusting method of the imaging apparatus of the above-described embodiment is a gain adjusting method in an imaging apparatus including (a) an electron multiplying solid-state image pickup device which has a plurality of arrayed pixels, outputs charge signals generated in the respective pixels, and has an electron multiplier section which multiplies charge signals, and (b) multiplication gain setting means for setting a multiplication gain for charge signals by setting a multiplication condition for the electron multiplier section of the solid-state image pickup device; the method includes: (c) a standard deviation calculation step for calculating a standard deviation of a noise image acquired under a predetermined imaging condition by the solid-state image pickup device as a noise standard deviation for gain adjustment; (d) a reference standard deviation reading-out step for reading-out a reference standard deviation acquired in advance as a noise standard deviation that becomes a reference for gain adjustment from storing means; (e) a standard deviation comparison step for comparing a noise standard deviation calculated in the standard deviation calculation step at the time of gain adjustment and the reference standard deviation readout in the reference standard deviation reading-out step and outputting the obtained comparison result; and (f) a multiplication gain adjustment step for adjusting the multiplication gain based on the comparison result in the standard deviation comparison step at the time of gain adjustment by the multiplication gain setting means.

In the above-described configuration, in detail, it is preferable that the noise image to be used for gain adjustment of the electron multiplying solid-state image pickup device is a dark output image by dark current noise acquired under a dark condition by the solid-state image pickup device. By using this dark output image for gain adjustment, the multiplication gain of charge signals can be highly accurately adjusted by using the correlation between the dark standard deviation and the multiplication gain.

It is preferable that the imaging apparatus includes exogenous noise removing means for removing image data containing exogenous noise from the noise image acquired by the solid-state image pickup device to be used for calculation of the noise standard deviation in the standard deviation calculating means. Similarly, it is preferable that the gain adjusting method of the imaging apparatus includes an exogenous noise removal step for removing image data containing exogenous noise from the noise image acquired by the solid-state image pickup device to be used for calculation of the noise standard deviation in the standard deviation calculation step. Thereby, the accuracy of gain adjustment of the solid-state image pickup device can be improved.

As a detailed method of gain adjustment, it is preferable that, in the imaging apparatus, the multiplication gain setting means adjusts the multiplication gain so that the noise standard deviation substantially coincides with the reference standard deviation in the comparison result by the standard deviation comparing means. Similarly, it is preferable that, in the gain adjusting method of the imaging apparatus, in the multiplication gain adjustment step, the multiplication gain is adjusted so that the noise standard deviation substantially coincides with the reference standard deviation in the comparison result in the standard deviation comparison step.

It is preferable that, for a detailed hardware configuration of the imaging apparatus, the imaging apparatus includes digital signal processing means including the standard deviation calculating means, the reference standard deviation storing means, and the standard deviation comparing means. By using such digital signal processing means such as the digital signal processor (DSP), an imaging apparatus having the above-described gain adjusting function can be preferably realized. Other configurations may also be used. Here, the digital signal processor (DSP) includes processors configured so as to be capable of processing digital signals in the broad sense.

The present invention is usable as an imaging apparatus which enables the user's side to easily and accurately re-adjust a multiplication gain of charge signals in an electron multiplying solid-state image pickup device, and a gain adjusting method for the same.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An imaging apparatus comprising:
  an electron multiplying solid-state image pickup device which has a plurality of arrayed pixels, outputs charge signals generated in the respective pixels, and has an electron multiplier section which multiplies the charge signals;
  multiplication gain setting means for setting a multiplication gain for the charge signals by setting a multiplication condition for the electron multiplier section of the solid-state image pickup device;
  standard deviation calculating means for calculating a standard deviation of intensity data in the plurality of pixel components of a noise image acquired under a predetermined imaging condition by the solid-state image pickup device as a noise standard deviation for gain adjustment;
  reference standard deviation storing means for storing a reference standard deviation acquired in advance as a noise standard deviation that becomes a reference for gain adjustment; and
  standard deviation comparing means for comparing the noise standard deviation calculated by the standard deviation calculating means at the time of gain adjustment and the reference standard deviation stored in the reference standard deviation storing means and outputting an obtained comparison result, wherein at the time of gain adjustment, the multiplication gain setting means adjusts the multiplication gain based on the comparison result by the standard deviation comparing means, the noise image is a dark output image by dark current noise acquired under a dark condition by the solid-state image pickup device, and wherein the imaging apparatus further comprises exogenous noise removing means for removing image data containing exogenous noise from the dark output image acquired by the solid-state image pickup device to be used for calculation of the noise standard deviation in the standard deviation calculating means, and the exogenous noise removing means sets a threshold for the intensity data in the respective pixel components of the dark output image, and excludes the intensity data equal to or more than the threshold from the calculation of the noise standard deviation as the exogenous noise.

2. The imaging apparatus according to claim 1, wherein the multiplication gain setting means adjusts the multiplication gain so that the noise standard deviation and the reference standard deviation substantially coincide with each other in the comparison result by the standard deviation comparing means.

3. The imaging apparatus according to claim 1, comprising digital signal processing means including the standard deviation calculating means, the reference standard deviation storing means, and the standard deviation comparing means.

4. A gain adjusting method of an imaging apparatus that includes:

an electron multiplying solid-state image pickup device which has a plurality of arrayed pixels, outputs charge signals generated in the respective pixels, and has an electron multiplier section which multiplies the charge signals, multiplication gain setting means for setting a multiplication gain for the charge signals by setting a multiplication condition for the electron multiplier section of the solid-state image pickup device, comprising:

a standard deviation calculation step of calculating a standard deviation of intensity data in the plurality of pixel components of a noise image acquired under a predetermined imaging condition by the solid-state image pickup device as a noise standard deviation for gain adjustment;

a reference standard deviation reading-out step of reading-out a reference standard deviation acquired in advance as a noise standard deviation that becomes a reference for gain adjustment from storing means;

a standard deviation comparison step of comparing the noise standard deviation calculated in the standard deviation calculation step at the time of gain adjustment and the reference standard deviation readout in the reference standard deviation reading-out step and outputting an obtained comparison result; and a multiplication gain adjustment step of adjusting the multiplication gain based on the comparison result in the standard deviation comparison step at the time of gain adjustment by the multiplication gain setting means, wherein the noise image is a dark output image by dark current noise acquired under a dark condition by the solid-state image pickup device, and wherein the gain adjusting method of an imaging apparatus further comprises an exogenous noise removal step of removing image data containing exogenous noise from the dark output image acquired by the solid-state image pickup device to be used for calculation of the noise standard deviation in the standard deviation calculation step, and in the exogenous noise removal step, a threshold is set for the intensity data in the respective pixel components of the dark output image, and the intensity data equal to or more than the threshold is excluded from the calculation of the noise standard deviation as the exogenous noise.

5. The gain adjusting method of an imaging apparatus according to claim 4, wherein in the multiplication gain adjustment step, the multiplication gain is adjusted so that the noise standard deviation and the reference standard deviation substantially coincide with each other in the comparison result in the standard deviation comparison step.

* * * * *